Patented June 16, 1942

2,286,712

UNITED STATES PATENT OFFICE 2,286,712

CHEWING GUM

Joseph N. Borglin, Wilmington, Del., assignor to Hercules Powder Company, Wilmington, Del., a corporation of Delaware No Drawing. Application October 16, 1940, Serial No. 361,393

8 Claims. (Cl. 99—135)

This invention relates to chewing gum material.

Chewing gum usually consists of a gum chicle base with various fillers, sweetening and flavoring ingredients. Because of the high cost of gum chicle and for other reasons, chicle substitutes such as blends of resinous material such as rosin with rubber or a rubber-like material, together with oily and waxy components if desired, are being used in place of part or all of the gum chicle in the base. Such substitutes have not been entirely satisfactory due to improper physical properties, instability, deterioration upon ageing, premature loss of flavor, and for other reasons. In many cases, these disadvantages are attributable to the resinous component employed. For example, rosin and ester gum may not impart sufficient hardness due to their low melting point, cause unduly rapid deterioration, show or develop a bitter flavor or pungency which are imparted to the gum, and make it difficult to formulate a gum or gum base having the desired physical properties.

It is an object of the present invention to provide an improved chewing gum overcoming to a large extent the disadvantages set forth above. Another object is to provide an improved chewing gum base adapted to be blended with the usual sweetening and flavoring components to yield an improved chewing gum. Still other objects will more fully hereinafter appear.

These objects may be accomplished by the use of polymerized rosin or polyhydric alcohol esters thereof in chewing gum. Polymerized rosin and polyhydric alcohol esters thereof offer numerous advantages over ordinary rosin or ester gum. The greater hardness and higher melting point of polymerized rosin and the polyhydric alcohol esters thereof are of distinct advantage in formulating a gum having the requisite physical characteristics. Polymerized rosin and polyhydric alcohol esters thereof are free from the bitterness, or pungency of ordinary rosin or ester gum and do not impart such objectionable flavors to the gum. Polymerized rosin and esters thereof produce firmer chewing gum, and since polymerized rosin and its esters are more stable to deterioration, the chewing gum made therewith is more stable and more resistant to deterioration.

Polymerized rosin and polyhydric alcohol esters thereof having a melting point of from about 90° C. to about 200° C., and containing from about 10% to about 100% of the dimer, are satisfactory for incorporation in chewing gum.

Polymerized rosin is rosin which has been polymerized by chemical treatment in known manner, and is characterized by a molecular weight of from about 5% to about 400% greater than ordinary rosin in its pure state, a melting point as determined by the Hercules Drop method above 85° C. and in general from about 5° C. to about 100° C. above that of ordinary rosin in its pure state, substantial freedom from hardening substances held in combination, an iodine value lower than that of rosin, and an acid number ranging from that of the original rosin down to about 100. It is preferred to use polymerized rosin having a melting point ranging from about 90° C. to about 176° C., the melting point of the pure dimer of rosin.

Polyhydric alcohol esters of polymerized rosin may be prepared by polymerizing the polyhydric alcohol of rosin or by esterification of polymerized rosin. It is preferred to use a polyhydric alcohol ester having a drop melting point of from about 90° C. to about 200° C. and having a molecular weight of from about 5% to about 400% greater than that of the corresponding ester of unpolymerized rosin.

Mixtures of polymerized rosin and polyhydric alcohol esters thereof in any proportion may be used, such mixtures preferably having a melting point of at least about 90° C. Likewise in completely esterified polymerized rosin may be employed, as for example the glycerine ester of polymerized rosin which ester has an acid number varying between that of the pure ester and that of the unesterified polymerized rosin.

It is preferred to use esters of polymerized rosin with polyhydric alcohols having at least three carbon atoms and at least three hydroxyl groups. Thus, esters with glycerine, diglycerine, sorbitol, mannitol, xylitol, adonitol, arabitol, erythritol, pentaerythritol, dulcitol, iditol, talitol, trimethylol methane (commonly designated as "isobutyl glycerine"), butantriol-1,2,3, pentaglycerol (methyl trimethylol methane), rhamnitol, inner ethers of hexahydric alcohols such as mannitan, sorbitan, dulcitan, etc., may be employed and are preferred because of their higher melting point and the non-toxic nature of the esters and the alcohols from which they are prepared. However, other polyhydric alcohol esters may be used, including the glycol esters with two hydroxyl groups and two or more carbon atoms, such as esters of ethylene glycol, diethylene glycol, trimethylene glycol, triethylene glycol, propylene glycol, alpha butylene glycol, beta butylene glycol (butandiol-2,3), butandiol-1,3, butandiol-1,4, tetramethylene glycol, isobutylene glycol, pinacol (tetramethyl glycol), etc., although on account of the softness of the esters and the reported toxicity of certain of the glycols such esters are not as preferred as those of the polyhydric alcohols having from three to six carbon atoms and from three to six hydroxyl groups as enumerated above. Other polyhydric alcohol esters may be employed, such as esters of still higher polyhydric alcohols, such as perseitol, lactositol, volemitol, enneaheptite $(C_8H_{13}(OH)_7)$, and other non-toxic saturated aliphatic compounds having a plurality of hydroxyl groups, such as glucose, sucrose; the dihydroxyl inner ether derivatives of the hexahydric alcohols, such as mannide, sorbide, dulcide, etc.; non-toxic polyhydroxy carboxylic acids, such as glyceric acid, gluconic acid, tartaric acid, trihydroxy glutaric acid, tetrahydroxy adipic acid, mucic acid, saccharic acid, etc.

Of the various esters enumerated, the glycerine ester is highly preferred because of its completely non-toxic nature, its consistency, and other properties and because it is commercially available at an economical price.

The polymerized rosin, or the polyhydric alcohol ester thereof, or the original rosin or rosin ester before polymerization, used in carrying out the invention, may be subjected to suitable known refining processes to reduce color, taste, or odor.

While polymerized rosin and the polyhydric alcohol esters thereof may be used interchangeably in the formulation of chewing gum, it is preferred to employ the polyhydric alcohol esters of polymerized rosin since such esters may readily be prepared with a much lower acid number than polymerized rosin itself. Desirably, the polyhydric alcohol ester employed has an acid number not over about 35 and preferably not over about 15.

In accordance with the present invention, polymerized rosin or the polyhydric alcohol ester thereof is preferably admixed with a rubbery or rubber-like material such as gum chicle, or substitutes therefor such as crepe rubber, smoked sheet, reclaimed rubber, guayule rubber, gutta percha, gutta siak, jelutong balata, factice, or the like. Natural rubber either in solid form or in the form of latex may desirably be employed as the rubbery or rubber-like constituent of the chewing gum base. Synthetic rubber and latices thereof may be used. It is preferred to use so-called "synthetic chicle," that is, low grade natural vegetable rubber-like materials too high in resin content (resin content ranging from about 25% and usually from about 40% up to about 90%) to be useful for rubber, such as materials selected from the group consisting of gutta percha, jelutong, balata, gum tuno, namaqualand rubber (from *Euphorbia drageana*), almeidana or euphorbia gum, abba rubber, and inferior guttas such as gutta siak, gutta cotie, gutta kay, gutta hang kang, gutta jangkar, gutta sundik, gutta soh, gutta susu, gutta penang, yellow gutta, and related materials, and mixtures of the foregoing materials with one another or with gum chicle. Instead of a single rubbery or rubber-like material, mixtures of two or more thereof may be employed. Polymerized rosin and the polyhydric alcohol esters thereof are completely miscible with the rubbery or rubber-like materials named. Preferably the rubbery or rubber-like material is used in an amount such as to yield a weight ratio to the polymerized rosin or polyhydric alcohol ester thereof ranging from about 20 to 1 to about 1 to 10 and preferably from about 2 to 1 to about 1 to 2.5.

The chewing gum base may embody other resins, synthetic or natural, such as ordinary rosin, ester gum, coumarone resin, pontianak resin, copal gum, kauri gum, dammar gum, sweet bay gum, spruce gum, balsams and the like, although it is preferred to keep the percentages of such resins at a minimum to avoid objectionable characteristics which may be imparted to the gum thereby.

There may be incorporated an oily softening agent such as petrolatum, beef stearin; vegetable oil such as cottonseed oil, olive oil, etc.; petroleum oil such as water-white mineral oil; hydrogenated vegetable oils such as hydrogenated cottonseed oil which preferably is solid at ordinary temperature, etc. Preferably the oily softening agent is present in minor amount, say not over about 25% by weight based on the weight of the chewing gum base, so as to impart no oily characteristic or flavor to the gum.

In addition, it is frequently desirable to incorporate in the composition a wax or wax-like material such as paraffin wax, beeswax, stearic acid, candelilla wax, ceresin wax, etc. The amount of wax may vary up to about 75% by weight of the base, although usually it will be less than about 35%.

There may be incorporated in the base small amounts of suitable fillers or pigmentary materials such as clay, calcium carbonate, magnesium carbonate, magnesium oxide, barium sulphate, calcium sulphate, carbon black, charcoal, diatomaceous earth, pumice, activated carbon, etc.

The several components are incorporated with one another to form the base in any desired manner as by melting them together or by working on a roll mill at temperatures below the melting point of the resinous and rubber-like ingredients or in any other suitable manner.

The foregoing methods of mixing are particularly advantageous where the rubber-like material is in solid form. However, where the rubber-like material is employed in the form of an aqueous dispersion as where rubber latex is employed, the latex may be mixed with the other components of the formulation at room temperature, after which the mixture may be heated to an elevated temperature until the water in the latex or initially present in the composition has been substantially evaporated.

Frequently, it is desirable to incorporate small amounts of water in the chewing gum base, this being particularly desirable where the rubber-like material is in solid form. The admixture of water in this manner produces a mellowing or softening effect on the gum. The amounts of water so incorporated may vary up to about 10% by weight of the chewing gum base where the rubber-like component is in solid form. Where an equeous dispersion of the rubber-like component is employed, it may, in some cases, be desirable to incorporate as much as 30% or 40% by weight of water in the chewing gum base. Generally, however, the amount of water left in the final chewing gum base will not exceed about 5-10%. Water in such amounts is very advantageous because of the desirable consistency and ease of manufacture into the final gum which it imparts to the chewing gum base.

The chewing gum base prepared as above, either before or after cooling, is admixed with sweetening material such as a mixture of powdered sugar and glucose, syrup, glucose, sucrose, invert sugar, levulose, saccharin, etc., and with suitable flavoring constituents such as oil of peppermint, spearmint, wintergreen, etc., licorice, vanilla, vanillin, etc., and, where gum chicle is not present in the mixture, dry cocoa powder or cocoa syrup.

Below are given several specific examples showing typical chewing gum bases embodying the principles of the present invention. The polymerized rosin used in Examples 1 to 3 had the following properties:

| | |
|---|---|
| Acid number | 151–155 |
| Color | 14–26 Amber |
| Grade | X to WG |
| Melting point (drop) | 98–101° C. |
| Color with 2% lead resinate | 25–40 Amber |

The glycerine ester of polymerized rosin used in Examples 4 to 6 was made by esterifying this polymerized rosin with glycerine under such conditions as to yield an ester having an acid number below 35, a melting point (drop) of 95° C. This ester was substantially the tri-ester.

Example 1

| | Percent by weight |
|---|---|
| Hydrogenated cottonseed oil ("Crisco") | 15.8 |
| Stearic acid | 15.8 |
| Crepe rubber | 15.8 |
| Gum chicle | 26.3 |
| Polymerized rosin | 26.3 |

The hydrogenated cottonseed oil and stearic acid were mixed and heated to 140° C., the rubber added, the mixture stirred at 140° C.–150° C. until homogenous, the gum chicle added and the mixture again stirred until uniform, whereupon the polymerized rosin was added with stirring until a uniform mixture was obtained.

Example 2

| | Percent by weight |
|---|---|
| Paraffin (M. P. 125° F.) | 72.5 |
| Crepe rubber | 14.5 |
| Polymerized rosin | 10.8 |
| Water | 2.2 |

The paraffin was heated to 140° C., the rubber added and the mixture stirred at this temperature until homogeneous. Then the polymerized rosin was added and the mixture again stirred until uniform. The hot product was allowed to cool to 95° C. whereupon the water was added and the product stirred vigorously to obtain a homogeneous mixture.

Example 3

| | Parts by weight | Per cent by weight (water-free basis) |
|---|---|---|
| Rubber latex (40%) | 40 | [1] 15 |
| Water | 40 | |
| Polymerized rosin | 40 | 37.7 |
| Stearic acid | 25 | 23.6 |
| Hydrogenated cottonseed oil ("Crisco") | 25 | 23.6 |

[1] Rubber.

These materials were mixed and then heated to 120° C. and maintained at this temperature with stirring until practically all of the water and latex preservatives had been driven off. The mixture was allowed to cool and yielded an excellent chewing gum base.

Example 4

This example was identical with Example 1 except that in place of polymerized rosin, there was employed the glycerine ester of polymerized rosin.

Example 5

This example was exactly like Example 2 except that in place of polymerized rosin, there was employed the glycerine ester of polymerized rosin.

Example 6

This example was formulated precisely like Example 3 except that the glycerine ester of polymerized rosin was substituted for the polymerized rosin.

From the foregoing, it is seen that the use of polymerized rosin and polyhydric alcohol esters thereof in chewing gum brings about numerous advantages among which are superior resistance to deterioration or development of objectionable taste, greater ease of formulation to the desired physical properties, better retention of flavor, economy of manufacture since the practice of the invention enables the chewing gum manufacturer to dispense with considerable or all of the gum chicle commonly employed, etc.

It will be understood that the details and examples hereinbefore set forth are illustrative only and that the invention as broadly described and claimed is in no way limited thereby.

What I claim and desire to protect by Letters Patent is:

1. Chewing gum material comprising a resinous material selected from the group consisting of polymerized rosin and polyhydric alcohol esters thereof.

2. Chewing gum material comprising polymerized rosin.

3. Chewing gum material comprising a polyhydric alcohol ester of polymerized rosin.

4. Chewing gum material comprising the glycerine ester of polymerized rosin.

5. Chewing gum material comprising a resinous material selected from the group consisting of polymerized rosin and polyhydric alcohol esters thereof, said resinous material having a melting point of at least about 90° C.

6. Chewing gum material comprising the glycerine ester of polymerized rosin, said ester comprising substantially the tri-ester and having a melting point of about 95° C. and an acid number not over about 35.

7. Chewing gum material comprising the glycerine tri-ester of polymerized rosin, said tri-ester having a melting point of about 95° C., and an acid number of not over about 15.

8. Chewing gum material comprising a resinous material selected from the group consisting of polymerized rosin and polyhydric alcohol esters thereof, said polymerized rosin and esters thereof having a molecular weight of from about 5% to about 400% greater than that of the original unpolymerized rosin and original esters of unpolymerized rosin respectively.

JOSEPH N. BORGLIN.